United States Patent [19]

Froats

[11] 4,162,768
[45] Jul. 31, 1979

[54] APPARATUS FOR SEPARATING PAPER FIBRES FROM PORTIONS OF POLYETHYLENE FILM MATERIAL

[76] Inventor: Blaine Froats, 210 Morrison Rd., Oakville, Ontario, Canada

[21] Appl. No.: 849,548

[22] Filed: Nov. 8, 1977

[51] Int. Cl.² .................. B02C 23/18; B02C 23/20
[52] U.S. Cl. .................................... 241/45; 241/79.2; 162/4; 209/250
[58] Field of Search ............. 241/40, 43, 45, 79, 241/79.1, 79.2; 34/10, 57 A, 57 C; 162/4; 209/3, 250

[56] References Cited

U.S. PATENT DOCUMENTS

| | | | |
|---|---|---|---|
| 1,403,399 | 1/1922 | Frist | 241/40 |
| 3,250,389 | 5/1966 | Scruby et al. | 209/250 |
| 3,484,948 | 12/1969 | Whelan | 34/57 C |
| 3,836,085 | 9/1974 | Brown | 241/79.1 |
| 3,929,293 | 12/1975 | Hahn et al. | 241/79.1 |
| 4,000,031 | 12/1976 | Acobas | 162/4 |

*Primary Examiner*—Joseph H. McGlynn

[57] ABSTRACT

An apparatus is disclosed for separating polyethylene film from paper fibre. The polyethylene film contaminated with paper fibres is subjected to treatment that converts the paper fibres into substantially uniform balls which are separated by gravity by being entrained in a stream of air with the polyethylene film pieces and impacted against a plurality of impact surfaces and the relatively light polyethylene film being separated from the relatively heavier damp paper fibres by means of a plurality of baffle separators relying upon gravity separation of the heavier components. Provision is made to remove the damp paper fibre balls and recover the polyethylene film from the apparatus.

8 Claims, 5 Drawing Figures

APPARATUS FOR SEPARATING PAPER FIBRES FROM PORTIONS OF POLYETHYLENE FILM MATERIAL

The present invention relates to an apparatus for separating polyethylene film from contaminating paper fibres in order to obtain a useful, recyclable polyethylene product.

BACKGROUND OF THE INVENTION

In modern day packaging, polyethylene film is frequently laminated to one or both sides of a paper substrate and the resulting laminated material is used for a wide variety of purposes.

One of the industries making a very substantial use of a product of this kind is the dairy industry which uses the product to make containers for milk, cream and the like. The manufacture of, for example, milk cartons from large sheets of paper laminated with polyethylene film on one or both sides is accomplished by cutting the large sheets into blanks of predetermined form and assembling them by methods which are well known in the art. The process results in the production of a substantial quantity of scrap material which is useless for recycling as a paper product since it is contaminated with polyethylene and is useless for recycling as a polyethylene product since it is contaminated with paper.

Current methods of attempting to recycle this material involve the passage of the scrap material through a device, well known in the art, known as a hydro-pulper which, in the presence of large quantities of water, either with or without other additives, causes a substantial separation of paper fibres from the polyethylene film and enables the paper fibres entrained in the water to be recovered to a substantial degree for recycling purposes. However, the polyethylene film which is a product of the hydro-pulper operation is still a virtually useless product because the separation from the paper fibres is incomplete and the polyethylene film, being contaminated by an unacceptably high level of paper fibres is useless as a recycling product.

Heretofore, it has not been possible to conveniently, economically and practically, separate the remaining paper fibres from the polyethylene film to produce a polyethylene film which is sufficiently free of paper fibre contamination to be acceptable as a usable polyethylene product.

FIELD OF THE INVENTION

The present invention proposes to accomplish the separation of the paper fibres from the polyethylene film pieces by an apparatus which will produce a polyethylene product of acceptable purity for recycling purposes and may, in addition, enable the remaining paper fibres to be recovered as a usable product.

SUMMARY OF THE INVENTION

Broadly speaking, the invention proposes to employ apparatus for stripping damp paper fibres from portions of polyethylene film comprising a shredding device for converting said polyethylene sheet/paper fibre to substantially uniform balls of paper fibre and small portions of polyethylene film, the uniform balls of paper fibre having an average diameter of about 2 mm. An air blower entrains the balls and film portions in a stream of air and projects them along a predetermined pathway to strike a first plurality of impact surfaces in said pathway to impact said paper fibre balls and polyethylene film to strip said paper fibres from said polyethylene film portions. A cascade of baffle separators having alternate high velocity passages and low velocity chambers in series provides air entrainment of said polyethylene film portions while allowing said paper balls to fall out in the low velocity chambers. A screen defining a bottom wall for said cascade of baffle separators lies above gravity collection chambers beneath the screens of each of said low velocity chambers to receive the denser, damp paper fibre balls that fall out through the screen in the low velocity chamber. Means to remove the paper fibre balls from the collection chambers, are provided as are means to collect the polyethylene portions at the downstream end of the cascade of baffle separators.

Figure 1:
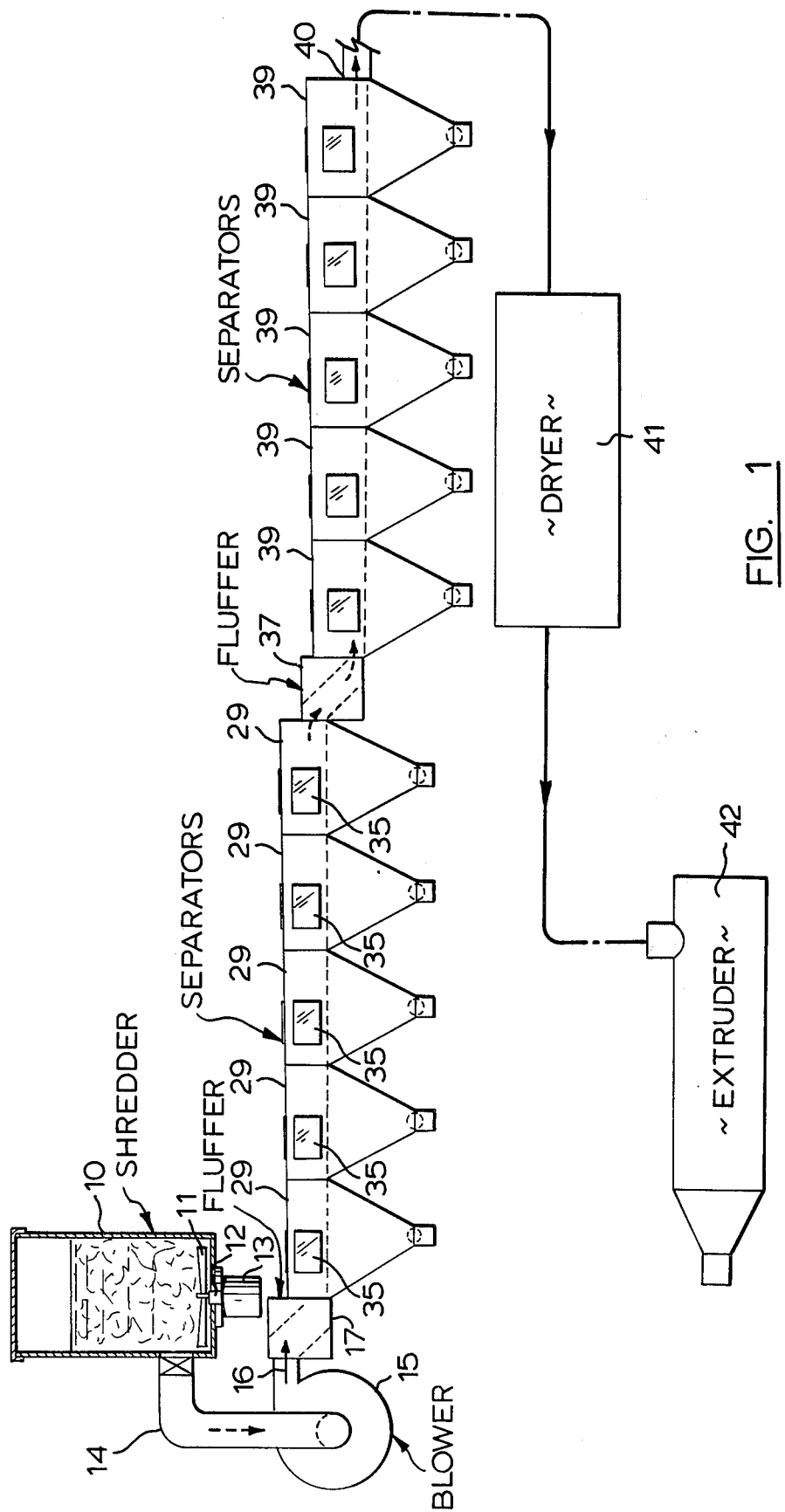
FIG. 1 is an overall schematic view of an apparatus, in side elevation, adapted to carry out the present invention.

Referring now in detail to FIG. 1, the drawing schematically illustrates a device identified by the legend -SHREDDER- which is a commercially available device manufactured in the United States of America by Bolton-Emerson, Inc. of 9 Osgood St., Lawrence, Mass. 01842 and sold under the trade mark ZERGLOMAT. In simplified form, this device functions somewhat in the manner of a domestic kitchen blender in that it comprises an outer cylindrical casing 10 having, within it, a rotating blade 11 mounted about a vertical axis 12 and driven by an electric motor 13.

The feedstock for the shredder is the product of the hydro-pulper and comprises pieces of polyethylene film of a variety of sizes which are contaminated by paper fibres. The feedstock, as it is received from the hydro-pulper, contains a substantial amount of water and at least some of this water is, desirably, removed from the feedstock before it is placed in the shredder. The removal of the water may be accomplished by any of a variety of means which will readily occur to those skilled in the art. The feedstock may be passed through rollers to squeeze out excess water, the feedstock may be centrifugally treated or the water may be removed in other ways. The feedstock that is placed in the shredder is, however, sufficiently damp that the paper fibres contain a proportion of water sufficient to make their specific gravity greater than that of the polyethylene film for reasons that will be apparent later in this description.

The shredder operates in a "batch" fashion and when charged with feedstock, and energized, converts the feedstock to substantially uniformly sized balls of paper fibre from which the polyethylene pieces have been largely stripped by impact with the rotating blades. The "balls" of damp paper fibre are of relatively higher density than the pieces of polyethylene film and are, accordingly, susceptible to gravity separation by air entrainment since, being small and relatively denser, they tend to fall out of the air stream while the lighter pieces of polyethylene film, having high air resistance and, accordingly, high air entrainment ability are passed through the apparatus to be recovered at the downstream end.

After treatment in the shredder, the contents thereof are discharged through a conduit 14 and entrained in a stream of air developed by the blower 15 and directed horizontally in the direction of the arrow 16 into the fluffer which is indicated generally by reference character 17 in FIG. 1.

Figure 2:
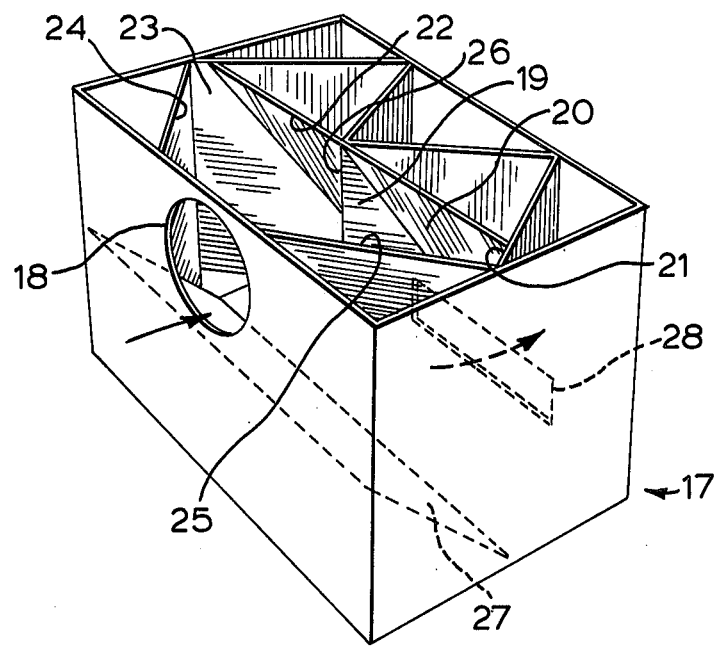
FIG. 2 is a perspective view, with the cover removed, of the component of FIG. 1 identified by the legend -FLUFFER-.

Turning now to FIG. 2, the fluffer 17 is seen to comprise an outer housing which is provided with an entrance aperture 18 which, in one embodiment of the invention, may conveniently have a diameter of something between 25 and 26 cm. The air entrained polyethylene film/paper fibre balls impacts against a first plurality of impact surfaces which bear reference numerals 19 to 27 inclusive in FIGS. 2 and 3 and all of which lie at an angle of less than 90° to the stream of air.

Broadly, the function of the first plurality of impact surfaces is to complete, by physical impact, the separation of the polyethylene film from the paper fibres and this is accomplished by causing the material to impact against the angularly disposed impact surfaces in a more or less random, highly turbulent manner. The relatively high velocity air stream in which the material is entrained assists in this separation due to the difference between the specific gravity of the damp paper fibre balls and the polyethylene film. The relatively low air resistance of the paper fibre balls and the relatively high air resistance of the polyethylene film pieces aids in this separation.

An exit passage 28 is provided from the fluffer chamber 17 and leads into the first of the cascade of separator chambers which are identified in FIG. 1 by the legend SEPARATORS and by reference numerals 29.

Figure 4:
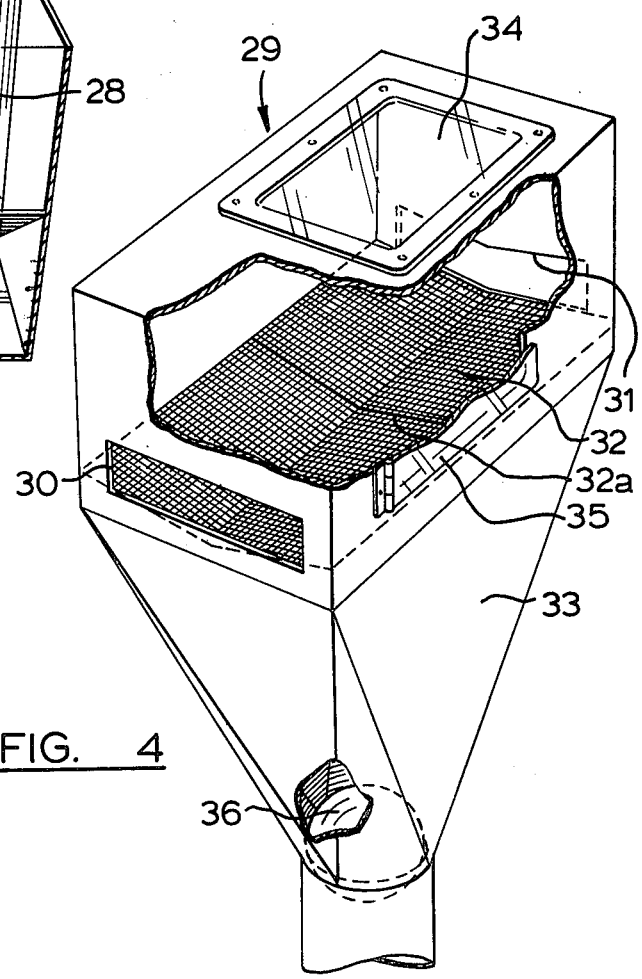
FIG. 4 is an enlarged view, partly broken away, of one of the elements of FIG. 1 identified by the legend -SEPARATORS-.

Each separator chamber 29 is as illustrated in FIG. 4, and comprises a generally rectangular chamber, the first in the cascade having a rectangular entrance aperture 30 and a chevron shaped exit aperture 31.

The function of each separator chamber is to provide alternate passages of high velocity (the entrance and exit apertures) and chambers of low velocity (the interior of each separator chamber 29) so as to enable the relatively heavier damp paper fibre balls to fall by gravity through a screen 32 into a gravity collection chamber 33 located beneath the screen. Conveniently, each separator chamber 29 is provided with a transparent window 34 through which the activity within the chamber may be observed. Clearly, the provision of the transparent window is optional and is not an essential feature of the invention.

In addition, each separator chamber may be provided with an openable access door 35 to provide access to the interior of the chamber for any of a variety of purposes that will readily be apparent.

The screen 32 in the first series of the cascade of separators will be of a mesh approximately 1 cm and will be formed in 2 sections, separated by a dividing line 32a so as to enable the screen to be removed through the access door 35.

The air entrained polyethylene film/balled paper fibre material, passing through the cascade of separator chambers will maintain the relatively lighter polyethylene film in air entrainment and will permit the relatively heavier damp paper fibre balls to fall through the screen into the collection chambers 33. Periodically, a discharge opening in the bottom of each collector chamber 33 will be opened to permit the accumulated paper fibre balls to fall downwardly to a point of collection which may be accomplished by any of several conventional means such as conveyors or the like. One convenient way of providing for the intermittent opening of the discharge opening in the bottom of the collection chamber 33 is to provide a spherical plug 36 which seats in a circular opening in the bottom of the collection chamber 33 and which may be intermittently lifted off its seat to permit the accumulated paper fibre balls to fall out through the discharge opening.

Figure 5:
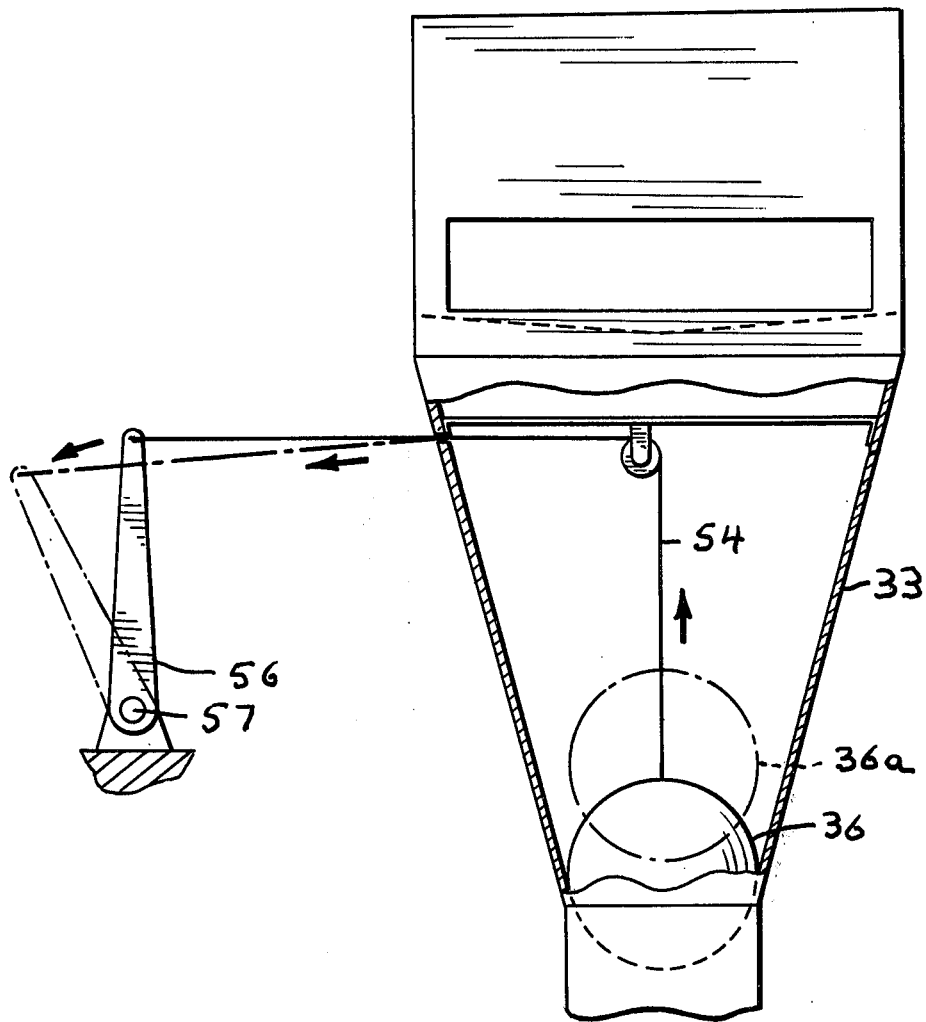
FIG. 5 is an end elevation, partly in section, of one of the elements of FIG. 1 identified by the legend -SEPARATORS-, showing the plug lifting mechanism.

Any convenient arrangement for lifting the spherical plugs 36 off their circular seats at the bottoms of the collector chambers 33 may be utilized. As seen in FIG. 5 a preferable arrangement utilizes a flexible member such as a cable 54 which is secured at one end to the plug 36 and at the other end to a lever 56, or the like, which when pivoted about axis 57 pulls the flexible member or cable 54 so as to lift the plug to its dotted line position 36A wherein product may flow out of the hopper 33. Utilization of a flexible member or cable 54 to lift a plug, such as plug 36, is well known in the art and is substantially shown in U.S. Pat. No. 1,347,383 to Kendt and U.S. Pat. No. 2,577,927 to Stockmar.

Figure 3:
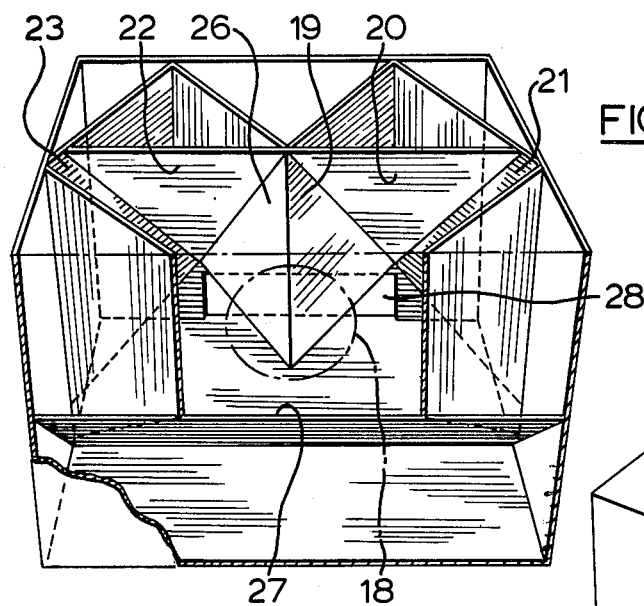
FIG. 3 is a perspective view, partly cut away, of the device of FIG. 2 taken from a different position.

Having passed through the first five separators of the cascade, the air entrained material enters a second fluffer 37 constructed in a manner identical to the fluffer 17 illustrated in greater detail in FIGS. 2 and 3. Here further impacting against a second plurality of impact surfaces takes place to further promote the physical separation of the polyethylene film from the damp paper fibre balls and, exiting from the second fluffer, the material passes through the second series of the cascade of separators identified by reference characters 39.

By the time the air stream leaves the final exit 40 of the last of the cascade of separator chambers, it will contain substantially pure polyethylene film and, at this point, it may be collected, passed to a dryer 41 in which, by conventional means, the moisture content may be reduced to the desired level and, from the dryer, the polyethylene film may be passed to an extruder 42 or to such other component of the apparatus as will produce a polyethylene product, suitable for recycling, in a form that can be readily shipped. The polyethylene film may be bagged, bailed, boxed or otherwise dealt with or, as illustrated in FIG. 1, may be extruded into pellets, rods, bars or the like for shipment to a point of further use.

From the foregoing description, it will be apparent that an apparatus has been provided which will accept a feedstock consisting primarily of polyethylene film contaminated with paper fibres and produce a reusable polyethylene of acceptable purity in a manner that is simple, efficient and economical of energy consumption.

Minor modifications in the particular details of construction illustrated in the drawings will occur to those skilled in the art and such modifications and alterations are intended to be encompassed within the scope of the appended claims.

I claim:

1. Apparatus for stripping damp paper fibers from portions of polyethylene film comprising:
    a shredding device for converting said polyethylene sheet/paper fibre to substantially uniform balls of paper fibre and small portions of polyethylene film, the uniform balls of paper fibre having an average diameter of about 2 mm; means including an air blower for entraining said balls and film portions in a stream of air and projecting them along a predetermined pathway; a first plurality of impact surfaces in said pathway to impact said paper fibre balls and polyethylene film to strip said paper fibres from said polyethylene film portions; a cascade of baffle separators having alternate high velocity passages and low velocity chambers in series to provide air entrainment of said polyethylene film portions while allowing said paper balls to fall out in the low velocity chambers, a screen defining a bottom wall for said cascade of baffle separators; gravity collection chambers beneath the screens of each of said low velocity chambers to receive the denser, damp paper fibre balls that fall out through the screen in said low velocity chamber; means to remove the paper fibre balls from the collection chambers, and means to collect the polyethylene portions at the downstream end of the cascade of baffle separators.

2. Apparatus as claimed in claim 1 wherein there is a high velocity passage entering and leaving each low velocity chamber.

3. Apparatus as claimed in claim 1 wherein each low velocity chamber is provided with an access door of a size sufficient to permit the screen associated with that low velocity chamber to be removed for cleaning purposes.

4. Apparatus as claimed in claim 1 wherein the means to remove the paper fibres from the collection chambers comprise means to intermittently open and close the lower surface of the collection chambers so that the damp paper fibre balls fall, due to the influence of gravity, out of the collection chambers.

5. Apparatus as claimed in claim 1 in which each of the first plurality of impact surfaces lies at an angle to the stream of air which angle is less than 90°.

6. Apparatus as claimed in claim 1 wherein each of the first plurality of impact surfaces slopes towards the high velocity passage leading into the first of the cascade of baffle separators.

7. Apparatus as claimed in claim 1 wherein the cascade of baffle separators begins immediately downstream of the first plurality of impact surfaces and is divided into two sections by means of a second plurality of impact surfaces.

8. Apparatus as claimed in claim 7 in which each of the second plurality of impact surfaces lies at an angle to the stream of air which angle is less than 90°.

* * * * *